US008342589B2

United States Patent
Kloepfer

(10) Patent No.: US 8,342,589 B2
(45) Date of Patent: *Jan. 1, 2013

(54) CONVERTIBLE TRAILER

(75) Inventor: Michael Kloepfer, Delhi (CA)

(73) Assignee: Tital Trailers, Inc., Delhi, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/300,309

(22) Filed: Nov. 18, 2011

(65) Prior Publication Data

US 2012/0061986 A1 Mar. 15, 2012

Related U.S. Application Data

(63) Continuation of application No. 13/169,285, filed on Jun. 27, 2011, which is a continuation-in-part of application No. 12/345,718, filed on Dec. 30, 2008, now Pat. No. 7,967,357.

(51) Int. Cl.
  B60P 7/02 (2006.01)
  B61D 39/00 (2006.01)
  B65F 3/00 (2006.01)
  B61D 3/06 (2006.01)
  B65F 3/14 (2006.01)
(52) U.S. Cl. ............... 296/40; 105/377.05; 105/377.11; 296/100.02; 296/100.03; 296/100.06; 296/100.07
(58) Field of Classification Search ............ 105/377.01, 105/377.04, 377.05, 377.06, 377.09, 377.11; 296/40, 100.01, 100.02, 100.03, 100.04, 296/100.05, 100.06, 100.07, 100.1, 219; 410/106, 108, 110, 120; 414/525.2
See application file for complete search history.

(56) References Cited

U.S. PATENT DOCUMENTS

| 337,831 | A | * | 3/1886 | Good et al. | 105/377.09 |
| 571,577 | A | * | 11/1896 | Richards | 105/377.09 |
| 2,312,512 | A | * | 3/1943 | Wiemer | 296/100.02 |
| 2,408,132 | A | * | 9/1946 | Weeks | 296/223 |
| 2,997,967 | A | * | 8/1961 | Malapert | 105/377.02 |
| 3,186,756 | A | * | 6/1965 | Barker et al. | 296/100.03 |
| 3,450,431 | A | * | 6/1969 | Tyler | 296/100.06 |
| 3,472,548 | A | * | 10/1969 | Comisac | 296/183.2 |
| 3,913,969 | A | * | 10/1975 | Hoch | 296/100.1 |

(Continued)

FOREIGN PATENT DOCUMENTS

EP  1120363 A1 * 8/2001

(Continued)

Primary Examiner — Glenn Dayoan
Assistant Examiner — Paul Chenevert
(74) Attorney, Agent, or Firm — McDermott Will & Emery LLP

(57) ABSTRACT

Trailers are described that include a chassis, a set of wheels for rollably supporting the chassis on the ground, and a rigid container carried by the chassis. The rigid container comprises a floor, a sidewall, an access door for loading/unloading materials into the container, and a convertible rigid roof. The convertible roof is movable between a closed position which permits waste or other materials to be compressed into the trailer, and an open position which permits the trailer to be loaded with bulk goods from the top. The convertible roof includes movable rigid panels, and a locking bar for holding the panels closed and connecting the opposite sidewalls of the trailer to each other against the expansion pressure exerted by loosely compressed materials transported in the trailer. The panels may be rotating panels hinged to a wall, or may be provided as sliding panels running in tracks.

36 Claims, 11 Drawing Sheets

U.S. PATENT DOCUMENTS

| | | | | |
|---|---|---|---|---|
| 4,302,044 A * | 11/1981 | Sims | ............... | 296/186.4 |
| 4,435,010 A * | 3/1984 | Mandel | ............... | 296/100.06 |
| 4,542,931 A * | 9/1985 | Walker, Jr. | ............... | 296/100.1 |
| 4,627,658 A * | 12/1986 | Vold et al. | ............... | 296/100.1 |
| 4,767,152 A * | 8/1988 | Stluka et al. | ............... | 296/100.1 |
| 4,979,866 A * | 12/1990 | Croy | ............... | 414/517 |
| 5,238,359 A * | 8/1993 | Chen | ............... | 414/517 |
| 5,820,192 A * | 10/1998 | Yarnavick | ............... | 296/40 |
| 6,017,081 A * | 1/2000 | Colby | ............... | 296/173 |
| 6,142,553 A * | 11/2000 | Bodecker | ............... | 296/98 |
| 6,152,511 A * | 11/2000 | Gustafson | ............... | 296/32 |
| 6,286,894 B1 * | 9/2001 | Kingham | ............... | 296/181.5 |
| 6,598,930 B1 * | 7/2003 | Tilton | ............... | 296/100.06 |
| 7,419,348 B2 * | 9/2008 | Byrne | ............... | 414/525.2 |
| 2007/0126209 A1 * | 6/2007 | Wolfe | ............... | 280/656 |
| 2009/0260305 A1 * | 10/2009 | Haub et al. | ............... | 52/281 |
| 2011/0030575 A1 * | 2/2011 | Schaefer et al. | ............... | 105/377.02 |

FOREIGN PATENT DOCUMENTS

| | | | |
|---|---|---|---|
| GB | 2429006 A * | 2/2007 | |
| JP | 54012167 A * | 1/1979 | |
| JP | 01060421 A * | 3/1989 | |
| JP | 01167048 A * | 6/1989 | |

* cited by examiner

CONVERTIBLE TRAILER

CROSS-REFERENCE TO RELATED APPLICATIONS

This application is a Continuation of U.S. application Ser. No. 13/169,285, filed Sep. 7, 2011, which is a Continuation-in-Part of U.S. application Ser. No. 12/345,718, filed Dec. 30, 2008 (now U.S. Pat. No. 7,967,357, issued Jun. 28, 2011) and entitled Convertible Trailer; the entire content of both applications is incorporated by reference herein.

FIELD OF THE INVENTION

The present invention relates generally to the field of transportation. More particularly, the present invention relates to a trailer for the transportation of compacted garbage and/or bulk material.

BACKGROUND OF THE INVENTION

Garbage, waste, or any other materials, which are compacted for transportation, require the use of fixed walled containers or trailers, which allow the transportation of materials in compacted form or the compacting of the material in the container or trailer itself. These types of trailers cannot backhaul any bulk goods on the way back from the unloading site, as their fixed and closed top does not allow loading from the top using a conventional loader, similar to an open-top trailer.

With the rising cost of fuel, the disposal of garbage becomes increasingly expensive, especially when the trailer cannot backhaul any goods to reduce the cost of waste disposal, and thus, returns empty from the unloading site.

On the other hand, open top trailers, even those which include a cover, cannot be used for compacting or for the transport of loosely compacted material.

United States Patent Application Publication No. 2007/0126209 (Wolfe) describes a trailer that converts into a shed. The trailer of Wolfe includes a convertible roof comprising two panels. However, the panels cannot be locked, and the walls are not rigid enough to withstand compressed materials.

European Patent Application No. 1,120,363 and United Kingdom Patent Application No. 2,429,006 (Sumpter) describe a trailer for the collection of waste comprising a chassis and a container. The container comprises a roof including an aperture closeable by a cover that slides over the aperture by means of a channel assembly. The cover may be a partly or fully retractable flexible sheet.

The structure of Sumpter does not allow the trailer to be used for transporting loosely compressed materials because the materials are distributed in the container using reciprocating slats, not a compactor. Furthermore, the cover disclosed in Sumpter is flexible and would thus not be able to withstand any pressure from within the container. Sumpter clearly does neither teach nor suggest using the container disclosed for transport of loosely compacted materials.

Neither Wolfe nor Sumpter deal with loosely compacted materials, and thus, fail to recognize the structural challenge created by internal pressures in a trailer upon compression of loose materials therein.

It is, therefore, desirable to provide a trailer that can accept and contain loosely compacted material, and which can also backhaul bulk goods on the way back from the unloading site in order to reduce the cost of transportation, which bulk goods are loaded from the top.

SUMMARY OF THE INVENTION

It is an object of the present invention to provide a trailer which can hold loosely compacted material or allows material to be compressed inside the trailer, but can also be loaded from the top to backhaul bulk goods on the way back from an unloading site.

This specification refers to loosely compacted materials which are compacted and maintained in the compacted condition solely by the trailer without any secondary containment or bundling structures. Thus, loosely compacted materials continuously exert an expansion force on the containment structure in which they are held.

In an aspect, the invention provides a container for a convertible trailer comprising a chassis for carrying the container and a set of wheels for rollably supporting the chassis on the ground, the container comprising a floor, a wall, and a roof, and an access door for loading loosely compressed materials into the container. The roof includes a pair of opposite rigid panels, respectively pivotally connected to opposite side walls of the container by multiple hinges for movement between a closed position wherein each panel forms part of a solid roof for loading of the container with loosely compressed materials from the access door, and an open position wherein the container can be loaded from the top with bulk material. The container includes a plurality of spaced apart locking bars distributed in longitudinal direction of the roof, for securing the panels in the closed position and for strengthening the wall against outward pressure exerted by the loosely compressed materials when loaded in the container. Due to the uneven outward pressure distribution along the length of the trailer when compacting pressure is applied from the access opening, it is important that a spacing of the locking bars is smaller proximal to than distal from the access door.

The container is preferably rectangular including a rear wall, a front wall and opposite sidewalls. In an embodiment, each locking bar is preferably secured to one of the panels at one end and includes a structure for releasably fastening an opposite end to the other panel when the panels are in the closed position, for releasably locking the panels in the closed position. In another embodiment, each locking bar is preferably provided adjacent and substantially aligned with a pair of hinges respectively connecting one of the panels to the associated sidewall, for connecting the opposite sidewalls to each other by way of the locking bars and against the outward pressure exerted by the loosely compressed materials compacted in the trailer. Preferably, the locking bars are positioned on the roof panels to be in symmetrical contact with the roof panel on each side. The locking bars may be releasably fastened at each end in order to allow for the complete removal of the locking bars for opening of the roof panels in restricted space situations, or to allow the roof panels to be opened with the locking bars attached to one or the other of the roof panels.

In another aspect, the container includes a mid span tie bar connecting a top edge of the sidewalls mid span of the trailer for added structural strength of the basic trailer structure, and a locking bar located directly above the tie bar. In another aspect, the number of locking bars between the tie bar and an access door end of the container, the access door half of the roof, is higher than the number of locking bars between the tie bar and the other end on the trailer. The number of locking bars on the access door half is preferably at least double the number on the other half. Most preferably, there are at least 6 locking bars on the access door half of the roof for added stability, resistance to movement and twisting and for resistance to compacting pressure exerted from the access opening.

In a further aspect of the invention, a rubber seal is provided between each roof panel and edges of the container walls adjacent the panel in its closed position to minimize spillage of materials carried in the trailer and intrusion of moisture and dirt into the container when the roof is closed. A rubber seal is preferably also provided between the panels at their meeting edges. Finally, a seal is preferably provided at the tie down bolt locations in order to minimize ingress of contamination into the container, especially during inclement weather conditions.

In another aspect of the invention, the roof panels are extruded panels and include edge extrusions for overlapping and interlocking engagement of the roof panels at their meeting edges when in the closed position. The edge extrusions are preferably constructed as a bottom overlap extrusion extending along the meeting edge of one panel and a top overlap extrusion extending along the meeting edge of the other panel and complementary to the bottom overlap extrusion. Most preferably, the roof panels are extruded aluminum panels.

In a further aspect of the invention, each locking arm has an attached half, which is rigidly welded to a first of the pair of roof panels and a free half for resting against and releasable attachment to the second of the pair of roof panels, when the roof panels are in the closed position. A rubber seal is preferably provided on the free end for cushioning between the free half and the second panel to prevent grinding of the locking bar against the second panel. A further rubber seal profile is preferably provided between the extruded aluminum roof panel and the mid top tie bar for cushioning.

In still another aspect of the invention, the free end of the locking bar is respectively releasably fastened to the second roof panel by a tie down assembly. The assembly preferably includes a nut and bolt connection, with the nut welded to one of the roof panel and the locking bar and the bolt extending through the other of the roof panel and the locking bar for engaging the nut and fasten the locking bar to the roof panel when the bolt is tightened in the nut.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings:

Figure 1:
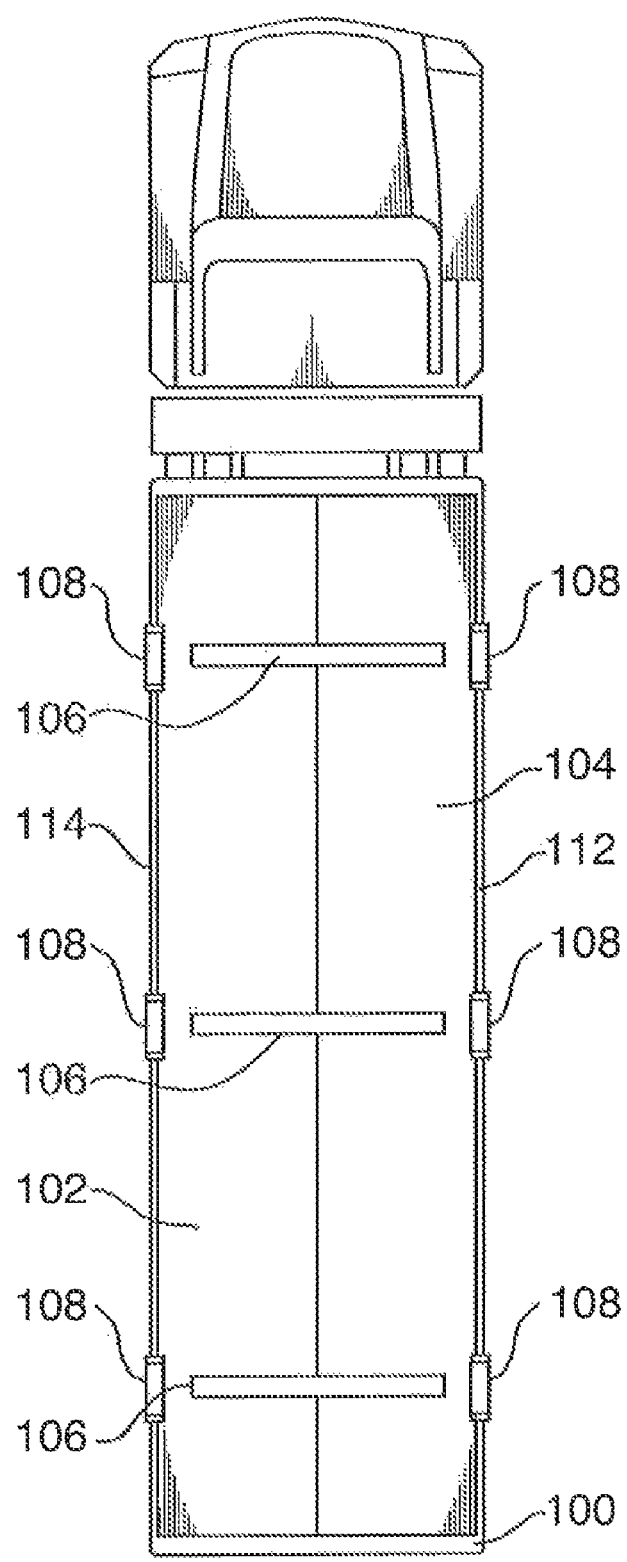
Figure 2:
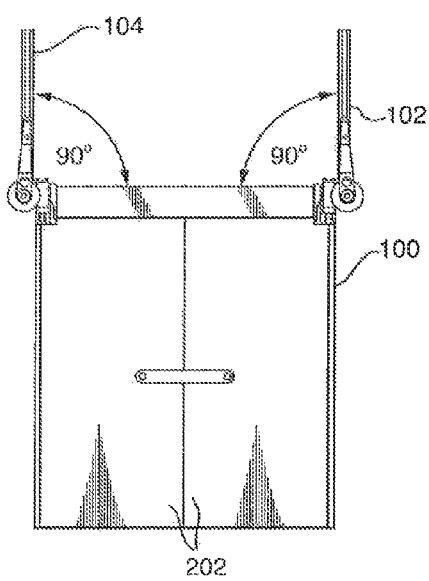
Figure 3:
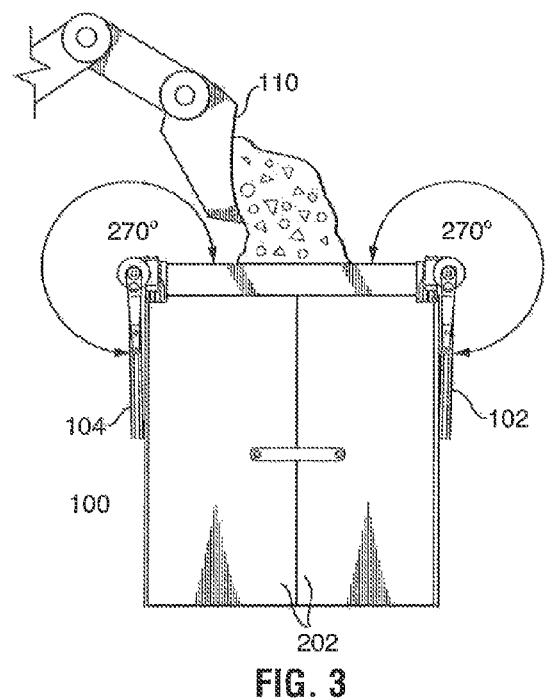
Figure 4:
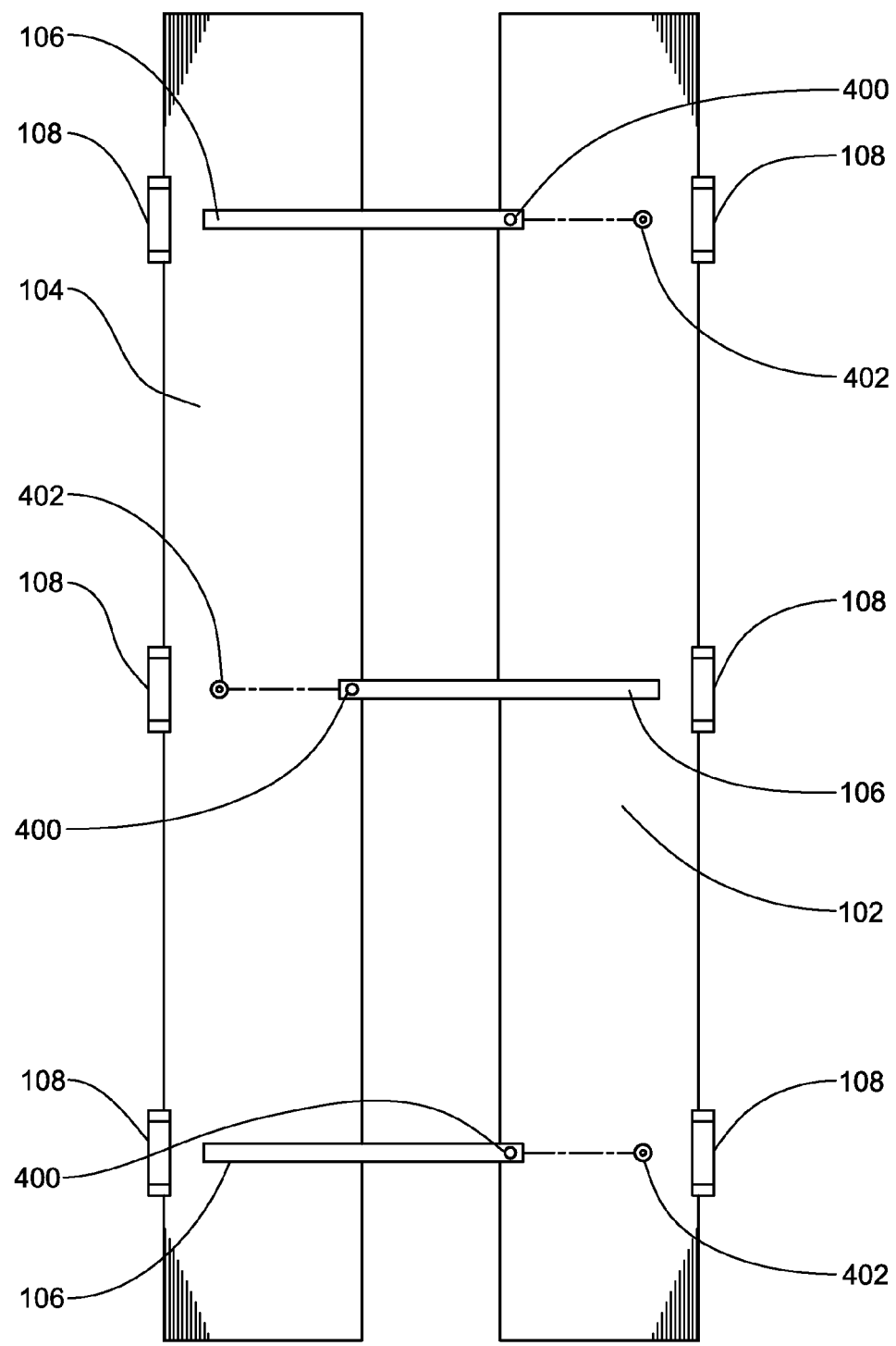
Figure 5:
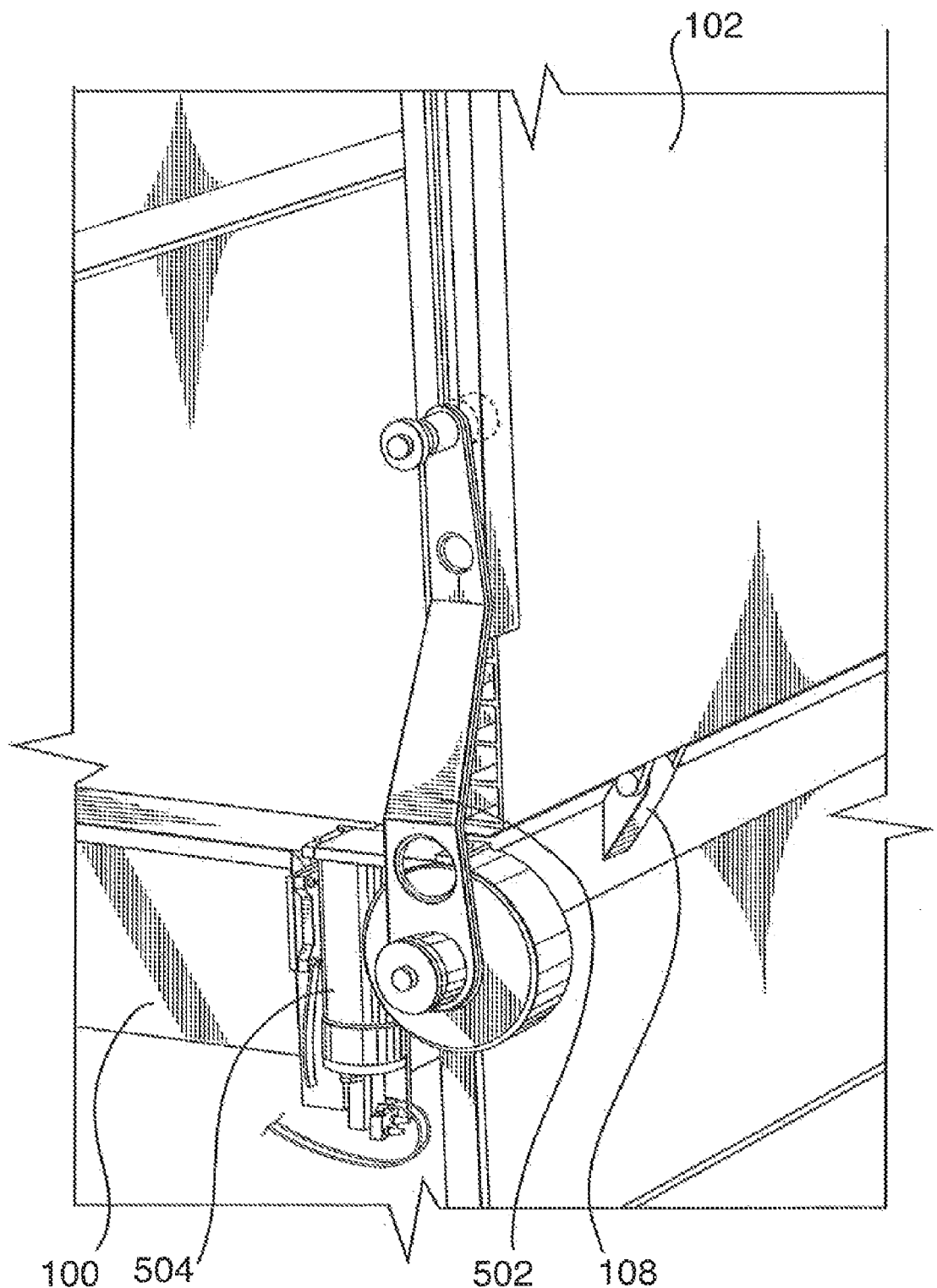
Figure 6:
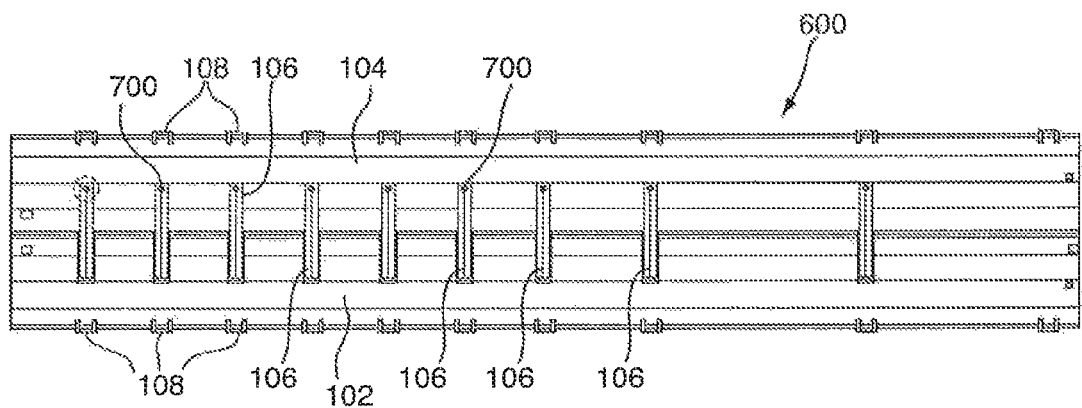
Figure 7:
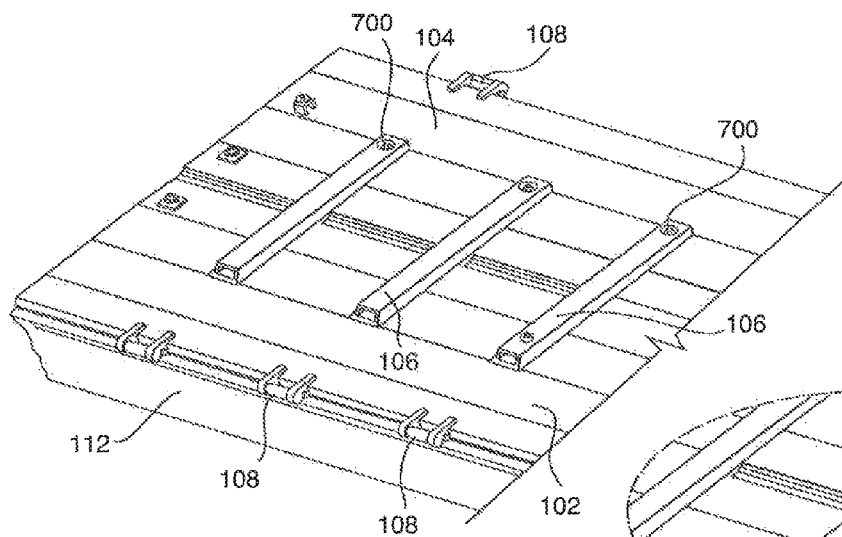
Figure 8:
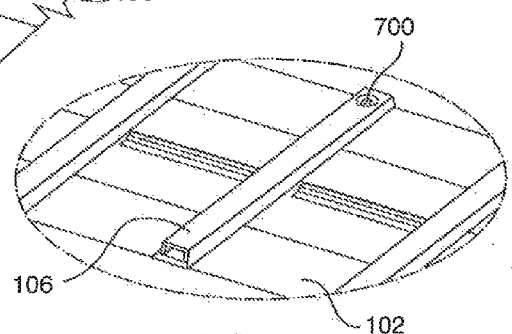
Figure 9:
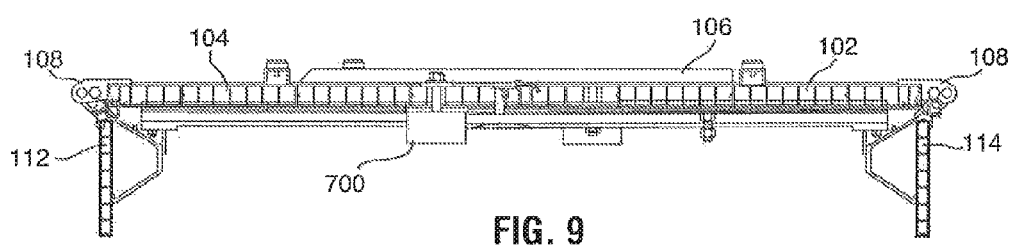
Figure 10:
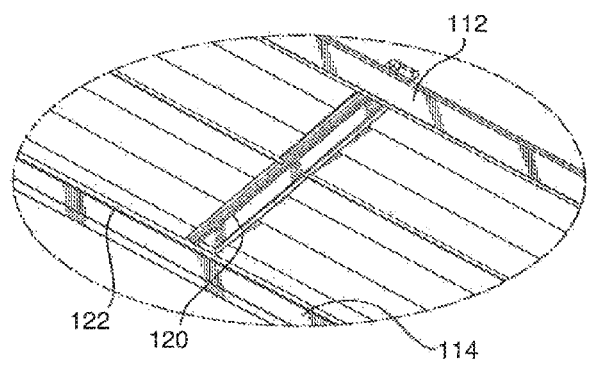
Figure 11:
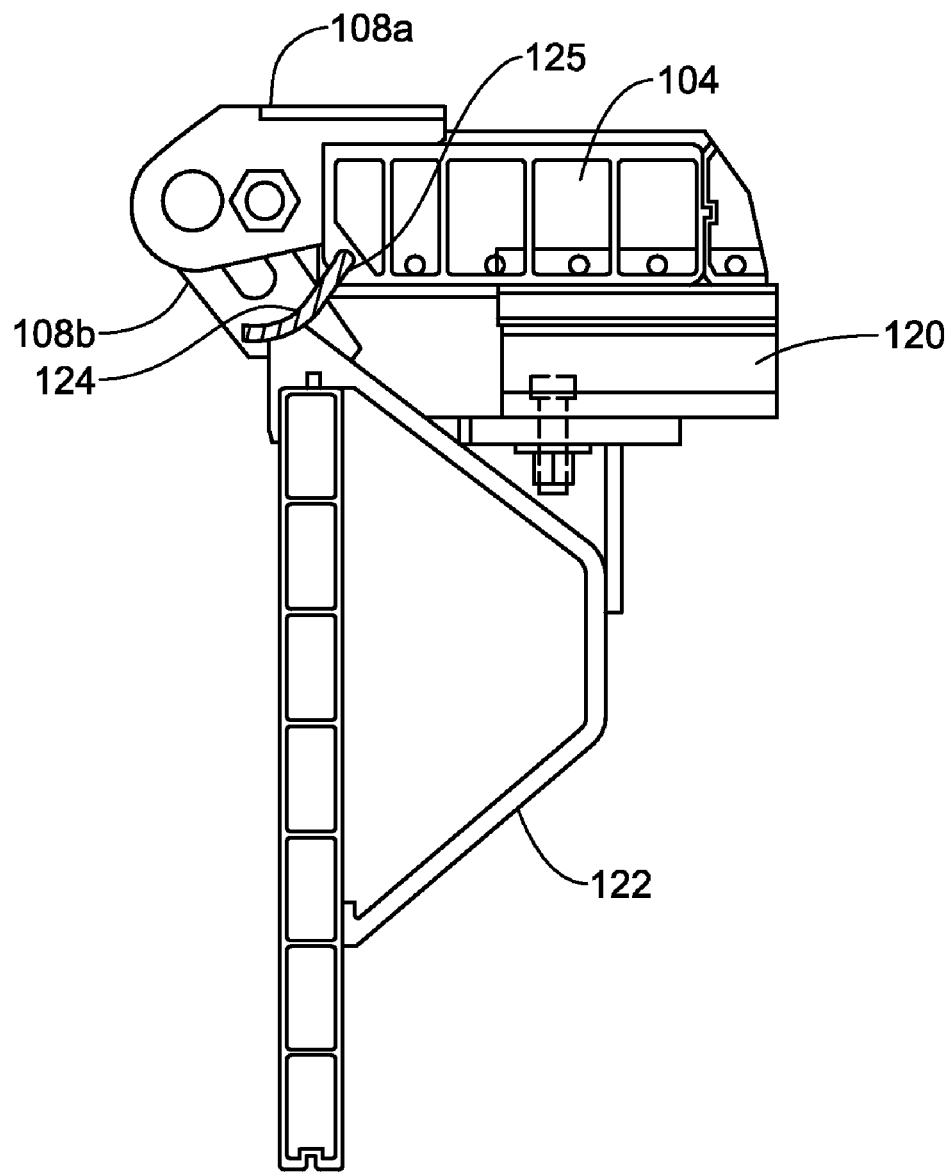
Figure 12:
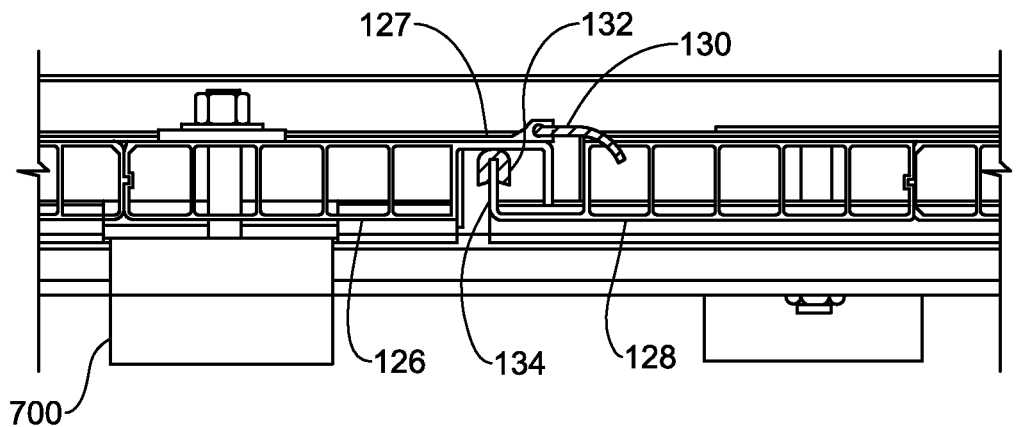
Figure 13:
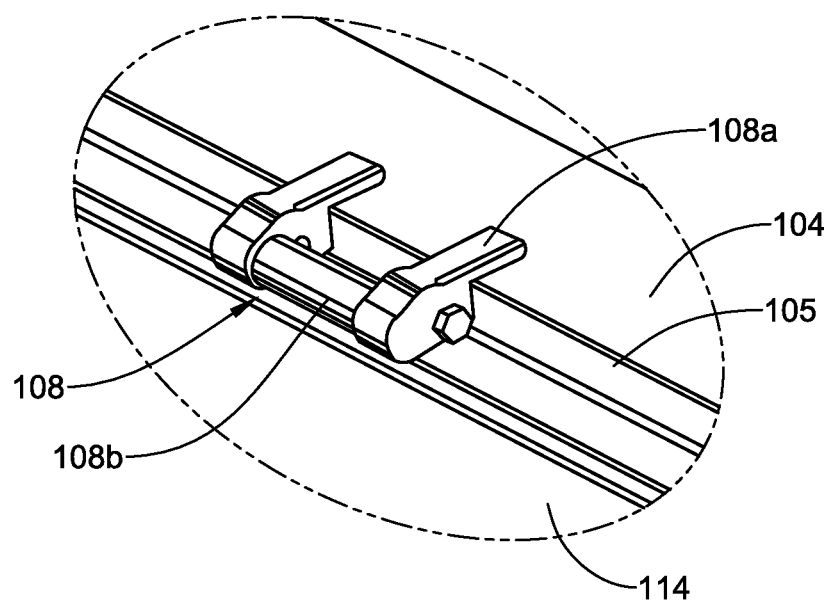
Figure 14:
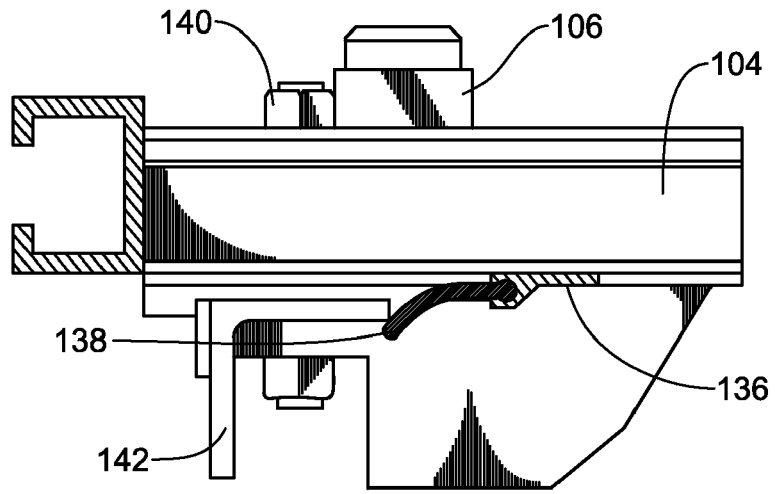
Figure 15:
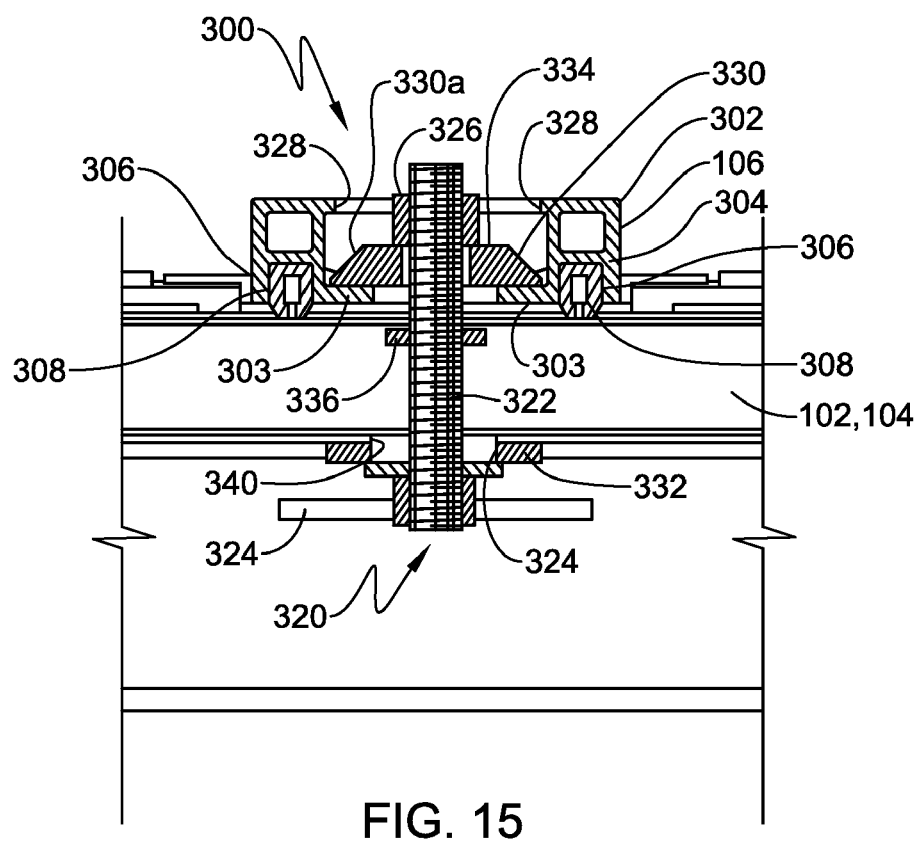
Figure 16:
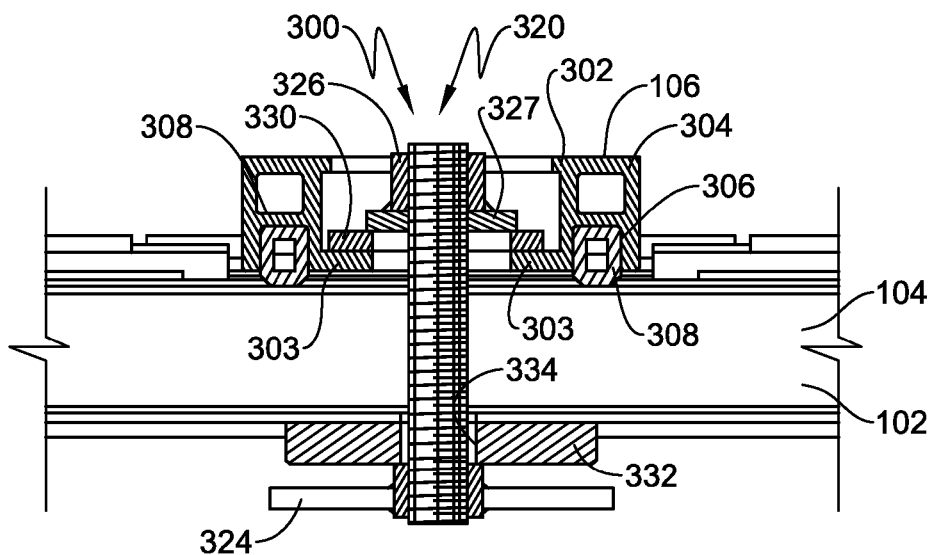
Figure 17:
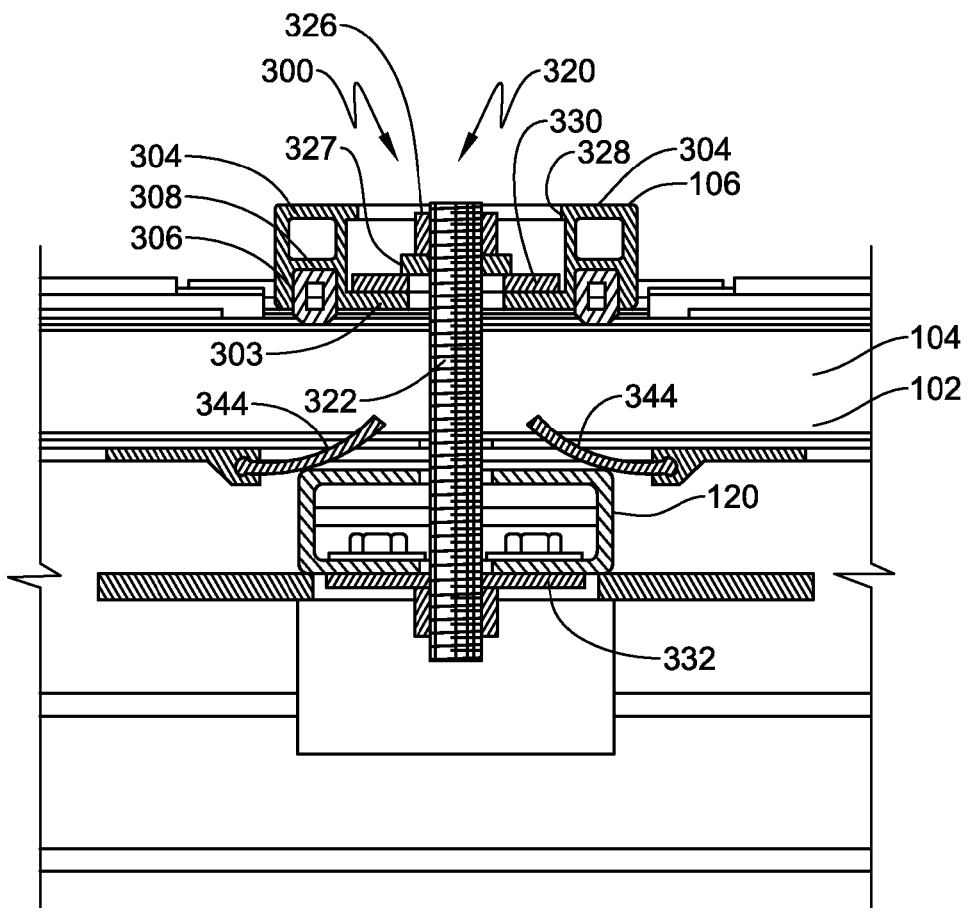

Embodiments of the present invention will now be described, by way of example only, with reference to the attached Figures, wherein:

FIG. 1 is a top view of a convertible trailer in accordance with an embodiment of the invention;

FIG. 2 is a rear view of the container of the trailer when the panels are 90 degrees open;

FIG. 3 is a rear view of the container of the trailer when the panels are fully open and the trailer is being loaded from the top;

FIG. 4 is an exploded view illustrating an embodiment of the invention, in which the locking bar is provided at both panels;

FIG. 5 illustrates the rotation mechanism of the panels;

FIG. 6 illustrates a top plan view of a preferred container roof construction;

FIG. 7 illustrates a perspective top view of an end of the roof construction shown in FIG. 6;

FIG. 8 illustrates an enlarged view of one of the locking bars shown in FIG. 7;

FIG. 9 illustrates a cross-sectional view of the roof structure shown in FIG. 6, at the location of one of the locking bars;

FIG. 10 is a bottom perspective view of the mid portion of the roof construction shown in FIG. 6 and illustrating the mid span tie bar;

FIG. 11 illustrates a corner detail of the cross-sectional view of FIG. 9;

FIG. 12 illustrates a center detail of the cross-sectional view of FIG. 9;

FIG. 13 illustrates a hinge detail of the perspective view of FIG. 7;

FIG. 14 is a cross-sectional view of an end of the roof construction of FIG. 7;

FIG. 15 is a cross-sectional view of a reverse tie down bolt construction in the roof construction illustrated in FIG. 7;

FIG. 16 is a cross-sectional view of a variant of the tie down bolt construction of FIG. 15; and FIG. 17 is a cross-sectional view of the tie down bolt construction used to engage the mid span tie bar.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

Generally, the present invention provides a container for loosely compacted materials which is convertible to a top loading bulk good container. In a preferred embodiment the invention provides a trailer comprising a chassis, a set of wheels for rollably supporting the chassis on the ground, and a rigid container carried by the chassis. The rigid container comprises a floor, a sidewall, an access door for loading/unloading materials into the container, and a convertible rigid roof. The convertible roof is movable between a closed position which permits waste or other materials to be compressed into the trailer, and an open position which permits the trailer to be loaded with bulk goods from the top. The convertible roof includes movable rigid panels, and a locking bar for holding the panels closed and connecting the opposite sidewalls of the trailer to each other against the expansion pressure exerted by loosely compressed materials transported in the trailer. The panels may be rotating panels hinged to a wall, or may be provided as sliding panels running in tracks.

FIG. 1 illustrates by way of example, a top view of a convertible trailer 100 in accordance with an embodiment of the invention. In the embodiment shown in FIG. 1, the roof of the trailer is made of two movable panels 102 and 104. When the panels 102 and 104 are in a closed position, as illustrated in FIG. 1, the convertible trailer 100 may be loaded with loosely compressed materials, such as garbage, from the access door using a compactor (not shown). The compactor applies pressure on the materials loaded in order to remove gaps for the most efficient use of the space inside the trailer. When the compactor is operated, the roof must be closed and rigid in order to withstand the outward expansion pressure exerted by the loose materials being compacted.

Once the convertible trailer 100 is unloaded at the unloading site, it may be loaded again to backhaul bulk goods on the return trip, in order to reduce transportation costs. If uncompressed bulk goods are to be transported, the convertible roof of the trailer 100 may be opened to allow the loading of the convertible trailer 100 from the top. For instance, the trailer 100 may be loaded with bulk goods like sand, gravel, or the like using a conventional loader 110. FIG. 2 is a rear view of the container of convertible trailer 100 when the panels 102 and 104 are 90 degrees open, and the access door 202 is closed, while FIG. 3 is a rear view of the container of the convertible trailer 100 when the panels 102 and 104 are fully open (270 degrees), and the trailer is being loaded from the top.

As shown in FIGS. 1 to 3, panels 102 and 104 are movable between a closed position, in which, the panels are substantially parallel and coplanar so as to form a solid hard roof as shown in FIG. 1, and an open position, in which, the panels are 270 degrees rotated from the closed position and, in which, the panels are substantially parallel to the left and right sidewalls of the trailer, as shown in FIG. 3.

When panels 102 and 104 are in the closed position, at least one locking bar 106 secures both panels to each other. The locking bar 106 may be provided on one of the panels or on both. FIG. 4 is an exploded view showing by way of example the locking bar 106 provided at both panels, in accordance with an embodiment of the invention. The locking bar 106 may be welded or permanently secured to one of the panels at one side and has one or more openings 400 at the other side, as illustrated in FIG. 4. The openings 400 provided in the locking bar overlap one or more threaded openings 402 in the other panel when the panels are in closed position for releasably securing the locking bar 106 to the other panel using bolts or the like.

Panels 102 and 104 are connected to the sidewalls 112, 114 of the trailer by hinges 108 as shown in FIGS. 1 and 4. The locking bar 106 is provided adjacent, and preferably aligned with the hinges 108 for connecting the sidewalls 112 and 114 to each other against the outward expansion pressure exerted by the loose materials being compacted and for preventing the sidewalls and the roof from bulging out and deforming.

Panels 102 and 104 are provided with a rotation mechanism that allows them to move between the closed position shown in FIG. 1, and the open position shown in FIG. 3. FIG. 5 illustrates, by way of example, an embodiment of the rotation mechanism that rotates the panels. As shown in FIG. 5, the rotation mechanism includes a bracket 502 and a worm drive or any other suitable rotating means 504. The bracket 502 is provided at the side of each of panels 102 and 104, and connected to the panel at one end and to the motor 504 at the other end.

In a preferred embodiment of the roof construction of the trailer 100, as shown in FIGS. 6 to 9, the roof 600 includes a pair of opposite rigid panels 102, 104, respectively pivotally connected to opposite side walls of the container by multiple hinges 108 for movement between a closed position as shown, wherein each panel forms part of a solid roof for loading of the container with loosely compressed materials from the access door, and an open position (not illustrated) wherein the container can be loaded from the top with bulk material. The container includes a plurality of spaced apart locking bars 106, distributed in longitudinal direction of the roof 600, for securing the panels 102, 104 in the closed position and for strengthening the sidewalls 112, 114 (see FIGS. 2 and 9) against outward pressure exerted by the loosely compressed materials when loaded in the container, a spacing of the locking bars 106 being smaller proximal to than distal from the access door 202 (see FIG. 2).

Each locking bar 106 is preferably secured to one of the panels 102, 104 at one end and includes a structure 700 for releasably fastening an opposite end to the remaining structure of the container in such a way that the panels are reliably maintained in the closed position. For example, the opposite end of the locking bar can be releasably fastened to the other of the panels 102, 104 when the panels 102, 104 are in the closed position, for releasably locking the panels 102, 104 in the closed position. The other end of the locking bar 106, however, may also extend around the top edge of the sidewall and come to rest against the sidewall for releasable attachment thereto, when the roof panels are in the closed position.

For added stability, each locking bar 106 is preferably provided adjacent to and substantially aligned with a pair of hinges 108 respectively connecting one of the panels 102, 104 to the associated sidewall 112 or 114, for connecting the opposite sidewalls 112, 114 to each other by way of the locking bars 106 and against the outward pressure exerted by the loosely compressed materials compacted in the trailer. The locking bars 106 may be releasably fastened at each end in order to allow for the complete removal of the locking bars 106 for opening of the roof panels 102, 104 in restricted space situations, or to allow the roof panels 102, 104 to be opened with the locking bars 106 attached to one or the other of the roof panels 102, 104.

In another aspect, the container as illustrated in FIG. 10, includes a tie bar 120 connecting a top edge of the sidewalls 112, 114 mid span of the trailer for added structural strength of the basic trailer structure, and a locking bar 106 located directly above the tie bar. In another aspect, the number of locking bars 106 between the tie bar 120 and an access door end 204 of the container, the access door half of the roof, is higher than the number of locking bars 106 between the tie bar 120 and the other end on the trailer. The number of locking bars 106 on the access door half is preferably at least double the number on the other half. The tie bar 120 is located mid span of the trailer and is always bolted at two locations to the structural top rail member 122 (see also FIG. 11) that is located at the top of the trailer sidewalls 112, 114 and which spans from sidewall 112 to sidewall 114.

As illustrated in FIGS. 11 and 13, each hinge 108 includes an outer hinge profile 108a welded to an outer surface 105 of one of the roof panels 102, 104 and a middle hinge profile 108b welded to the top rail 122 of one of the sidewalls 112, 114. A rubber seal 124 is inserted into a seal slot 125 on the extruded roof panel 102 or 104. The rubber seal 124 has a curved profile allowing it to curl on top of the top rail 122 and rest on the top rail 122 when the roof panel 102, 104 is closed. The rubber seal 124 acts as a seal to prevent fill in the trailer escaping from the container and to prevent humidity entering the container.

As illustrated in FIG. 12, the roof panels 102, 104 respectively include at their meeting edges a top overlap extrusion 126 and a bottom overlap extrusion 128. The top and bottom overlap extrusions 126, 128 overlap and interlock when the panels 102, 104 are in the closed position, as shown in FIG. 12. The top overlap extrusion 126 is provided with a rubber seal extrusion 127 and a rubber seal 130, which runs the length of the bottom overlap extrusion 128 and engages the opposite roof panel to prevent material from exiting or entering the container in the meeting area of the roof panels 102, 104, when the panels are in the closed position. A rubber seal cap 132 is provided on the lip 134 of the bottom overlap extrusion 128 to provide a seal between the top and bottom overlap extrusions 126, 128 and to prevent metal to metal contact at the meeting edge of the panels 102, 104.

FIG. 14 illustrates the end construction of the roof of the container of the invention and shows a rubber seal extrusion 136 mounted to a bottom surface of the roof panel 102, 104 and a rubber seal 138 inserted into the extrusion to seal the gap between the roof panel 102, 104 and the top of the end wall, here represented by the angle bracket 142, which is welded to the end wall (not shown). A bolt 140 can be used to secure the roof panel 102, 104 to the end wall by fastening it to the angle bracket 142. Angle bracket 142 is welded to a structural rear header (not shown) located at the rear of the trailer. The rear header spans from structural post to structural post on the trailer body. This allows the placement of two bolts at the very rear of the roof to anchor the roof to a structural member of the container body. DETACLAD material is an explosion welded sandwich of aluminum and steel, in order to avoid electrolytic corrosion between the steel and aluminum portions. DETACLAD material is welded to the angle bracket allowing a nut to be welded in place, which allows the tie down bolt to fasten the roof in place. The front end construction is assembled accordingly with the angle bracket attached to a front header. Rubber seals are provided at the front end as well.

As illustrated in FIGS. 15 to 17, the tie down assembly 300 is an upside down assembly which allows a tie down bolt to be tightened from inside the trailer, obviating the need for the operator to climb on top of the trailer to lock down the roof. It would of course also be possible to install the tie down bolt in an upright orientation in which the tie down bolt is fastened from on top of the roof.

The illustrated tie down assembly 300, includes the locking bar 106 and the tie down bolt assembly 320. The locking bar 106 is an aluminum extrusion 302 with a generally C-shaped cross-sectional profile with hollow arms 304 and bottom grooves 306 incorporated into the arms of the extrusion for receiving and holding a rubber seal 308. The tie down bolt assembly 320 includes the threaded tie down bolt 322, a handle 324 welded to the bolt 322 for ease of rotation and tightening of the bolt 322, and a nut 326 for threaded engagement by the bolt 322. An access opening 328 is cut into the extrusion 302 at the location of the tie down bolt assembly 320 to recess the assembly into the locking bar 106 to allow for an optimum volume of the trailer (due to overall height restrictions). A top stiffener plate 330 is welded to the extrusion 302 in the access opening 328 to stiffen up the locking bar 106 where the arm will be tightened down by the tie down bolt assembly 320. A bottom stiffener plate 332 is welded to the underside of the roof panel 102, 104 to stiffen up the panel where the panel will be engaged by the tie down bolt assembly 320. Both stiffener plates 330, 332 are preferably provided with a slot profile 334 for receiving the bolt 322, in order to allow for adjustment of the bolt location during bolt installation as well as to absorb some shifting in the roof fore and aft during twisting and turning of the container. The nut 326 for engagement by the bolt 322 is welded to the top stiffener plate 330. A washer 336 is welded to the bolt to prevent the bolt from falling through the roof during bolt release from the nut 326.

At least one of the stiffener plates 330, 332 is preferably made of DETACLAD material. If the top stiffener plate 330 is made of DETACLAD material (see FIG. 15), the edges 330a of the DETACLAD material are preferably beveled to allow for welding it inside the access opening 328 to the inwardly projecting arms 303 of the extrusion 302. If the bottom stiffener plate 332 is made of DETACLAD material (see FIG. 16), the nut 326 is welded to a flat steel washer 327, which rests on top of the top stiffener plate 330.

The rubber seal 308 is inserted into the bottom grooves 306 of the locking arm extrusion 302 to allow for some cushioning between the locking bar 106 and the roof panel 102, 104 to avoid metal resting on metal.

A slot profile 340 is cut through the roof panel 102, 104 to accommodate the tie down bolt 322. The slot profile 340 runs from the front to the back to allow for some movement in the locking bar 106 front to rear of the trailer.

At the location of the mid span tie bar 120, the tie down bolt 322 extends not only through the roof panel 102, 104, but also through the tie bar 120 and the bottom stiffener plate 332 is welded to the bottom surface of the tie bar 120 (see FIG. 17). Rubber seal profiles 344 rest between the extruded aluminum roof panel 102, 104 and the mid span tie bar 120 localized around the region of the tie down assembly 300 for cushioning between the panel and the tie bar.

Although tie down arrangements in the form of a nut and bolt assembly are disclosed in detail, other tie down arrangements which provide for a reliable and releasable fastening of the free half of the locking bar to the second roof panel can be used. For example, the tie down arrangement may be provided by a pair of eyelets, one each on the free end of the locking bar and on the second the roof panel (not illustrated), which are positioned to be adjacent and co-centric when the roof is closed, and by a locking bar which is movable between a locked position in which it fittingly extends through both eyelets and an unlocked position in which the locking bar is positioned clear of both eyelets. Other tie down arrangements which reliably and releasably lock the roof panels in the closed position can be used.

While the embodiments shown in FIGS. 1 to 17 illustrate a longitudinal container, it is possible to implement the convertible roof of the invention in a trailer having oval, cylindrical, or any polygonal shaped container including a floor, a sidewall, and an access door for loading compressed materials when the convertible roof is in closed position.

Furthermore, different locks may be used for locking the panels in closed positions for connecting opposite sidewalls by the locking bar against the outward pressure of the compressed materials. The implementation and details of such locks are known in the art, and will not be described in detail herein.

In the preceding description, for purposes of explanation, numerous details are set forth in order to provide a thorough understanding of the embodiments of the invention. However, it will be apparent to one skilled in the art that these specific details are not required in order to practice the invention.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A container for a convertible trailer including a chassis for carrying the container and a set of wheels for rollably supporting the chassis on the ground, the container comprising a floor, a wall, a roof, and an access door for loading loosely compressed materials into the container, the roof including a pair of opposite rigid panels, respectively pivotally connected to opposite side walls of the container by multiple hinges for movement between a closed position wherein each panel forms part of a solid roof for loading of the container with loosely compressed materials from the access door, and an open position wherein the container can be loaded from the top with bulk material, and a plurality of spaced apart locking bars distributed in longitudinal direction of the roof, for selectively maintaining the panels in the closed position against outward pressure exerted by the loosely compressed materials when loaded in the container and for strengthening the wall against the outward pressure, a spacing of the locking bars being smaller proximal to than distal from the access door, wherein each locking arm has an attached half, which is rigidly welded to a first of the pair of roof panels and a free half for resting against and releasable attachment to the second of the pair of roof panels, when the roof panels are in the closed position; wherein the free half of the locking bar is respectively releasably fastened to the second roof panel by a nut and bolt connection; and, wherein the nut is rigidly attached to one of the roof panel and the locking bar and the bolt extends through the other of the roof panel and the locking bar for engaging the nut and fastening the locking bar to the roof panel when the bolt is tightened in the nut.

2. The container of claim 1, wherein a first rubber seal is provided between each roof panel and edges of the container walls adjacent the panel in the closed position to minimize spillage of bulk materials carried in the trailer and intrusion of moisture and dirt into the container when the roof is closed.

3. The container of claim 2, wherein a second rubber seal is provided between the panels at their meeting edges.

4. The container of claim 1, wherein the roof panels are extruded panels and include edge extrusions for overlapping and interlocking engagement of the roof panels at their meeting edges when in the closed position.

5. The container of claim 4, wherein the edge extrusions are constructed as a bottom overlap extrusion extending along the meeting edge of one panel and a top overlap extrusion extending along the meeting edge of the other panel and complementary to the bottom overlap extrusion.

6. The container of claim 1, wherein the container is rectangular shaped, and the wall of the container includes a rear wall, a front wall and two opposite sidewalls and each locking bar is provided adjacent and substantially aligned with a pair of hinges respectively connecting one of the panels to the associated sidewall, for connecting the opposite sidewalls to each other by way of the locking bars and against the outward pressure exerted by the loosely compressed materials compacted in the trailer.

7. The container of claim 6, wherein the locking bars are releasably fastened at each end in order to allow for the complete removal of the locking bars for opening of the roof panels in restricted space situations, or for opening of the roof panels with the locking bars attached to one or the other of the roof panels.

8. The container of claim 6, wherein the locking bars are positioned on the roof panels to be in symmetrical contact with the roof panel on each side.

9. The container of claim 8, wherein the container includes a tie bar connecting a top edge of the sidewalls mid span of the trailer for added structural strength of the basis trailer structure, and a locking bar located directly above the tie bar.

10. The container of claim 9, wherein the number of locking bars between the tie bar and an access door end of the container, the access door half of the roof, is higher than the number of locking bars between the tie bar and the other end on the trailer.

11. The container of claim 10, wherein the number of locking bars on the access door half is at least double the number on the other half.

12. The container of claim 11, including at least 6 locking bars on the access door half of the roof for added stability, resistance to movement and twisting and for resistance to compacting pressure exerted from the access opening.

13. A convertible trailer, comprising a chassis, a set of wheels for rollably supporting the chassis on the ground, and a container according to any one of claims 1 to 5 mounted on and supported by the chassis.

14. A container for a convertible trailer including a chassis for carrying the container and a set of wheels for rollably supporting the chassis on the ground, the container comprising a floor, a wall, a roof, and an access door for loading loosely compressed materials into the container, the roof including a pair of opposite rigid panels, respectively pivotally connected to opposite side walls of the container by multiple hinges for movement between a closed position wherein each panel forms part of a solid roof for loading of the container with loosely compressed materials from the access door, and an open position wherein the container can be loaded from the top with bulk material, and a plurality of spaced apart locking bars distributed in longitudinal direction of the roof, for selectively maintaining the panels in the closed position against outward pressure exerted by the loosely compressed materials when loaded in the container and for strengthening the wall against the outward pressure, a spacing of the locking bars being smaller proximal to than distal from the access door;

wherein each locking arm has an attached half, which is rigidly welded to a first of the pair of roof panels and a free half for resting against and releasable attachment to the second of the pair of roof panels, when the roof panels are in the closed position; and, wherein a rubber seal is provided on the locking bar for cushioning between the free half and the second panel to prevent grinding of the locking bar against the second panel.

15. A convertible trailer, comprising a chassis, a set of wheels for rollably supporting the chassis on the ground, and a container according to claim 14 mounted on and supported by the chassis.

16. A container for a convertible trailer including a chassis for carrying the container and a set of wheels for rollably supporting the chassis on the ground, the container comprising
- a floor,
- a wall,
- a roof, and
- an access door for loading loosely compressed materials into the container, the roof including a pair of opposite rigid panels, respectively pivotally connected to opposite side walls of the container by multiple hinges for movement between a closed position wherein each panel forms part of a solid roof for loading of the container with loosely compressed materials from the access door, and an open position wherein the container can be loaded from the top with bulk material, and a plurality of spaced apart locking bars distributed in longitudinal direction of the roof, for selectively maintaining the panels in the closed position against outward pressure exerted by the loosely compressed materials when loaded in the container and for strengthening the wall against the outward pressure, a spacing of the locking bars being smaller proximal to than distal from the access door;
- wherein each locking bar is preferably secured to one of the panels at one end and includes a structure for releasably fastening an opposite end to another part of the container when the panels are in the closed position, for releasably locking the panels in the closed position;
- wherein the container is rectangular shaped, and the wall of the container includes a rear wall, a front wall and two opposite sidewalls and each locking bar is provided adjacent and substantially aligned with a pair of hinges respectively connecting one of the panels to the associated sidewall, for connecting the opposite sidewalls to each other by way of the locking bars and against the outward pressure exerted by the loosely compressed materials compacted in the trailer;
- wherein the locking bars are releasably fastened at each end in order to allow for the complete removal of the locking bars for opening of the roof panels in restricted space situations, or for opening of the roof panels with the locking bars attached to one or the other of the roof panels; and
- wherein a rubber seal profile is provided between the tie bar and the roof panels for cushioning.

17. A convertible trailer, comprising a chassis, a set of wheels for rollably supporting the chassis on the ground, and a container according to claim 16 mounted on and supported by the chassis.

18. A container for a convertible trailer including a chassis for carrying the container and a set of wheels for rollably supporting the chassis on the ground, the container comprising
- a floor,
- a wall,
- an access door for loading loosely compressed materials into the container,
- a roof including a pair of opposite rigid panels, respectively pivotally connected to opposite side walls of the container by multiple hinges for movement between a closed position wherein each panel forms part of a solid roof for loading of the container with loosely compressed materials from the access door, and an open position wherein the container can be loaded from the top with bulk material,
- a plurality of spaced apart locking bars distributed in longitudinal direction of the roof, for selectively maintaining the panels in the closed position against outward pressure exerted by the loosely compressed materials when loaded in the container and for strengthening the wall against the outward pressure, a spacing of the locking bars being smaller proximal to than distal from the access door; each locking bar having an attached half, which is attached to a first of the pair of roof panels and a free half for resting against and releasable attachment to the second of the pair of roof panels, when the roof panels are in the closed position; and
- a rubber seal provided on each locking bar for cushioning between the free half and the second panel to prevent grinding of the locking bar against the second panel.

19. The container of claim 18, wherein the attached half is permanently attached to the first of the pair of roof panels.

20. The container of claim 18, wherein the container is rectangular shaped and the wall of the container includes a rear wall, a front wall and two opposite sidewalls and the container further includes a tie bar connecting a top edge of the sidewalls mid span of the trailer for added structural strength of the container structure, a locking bar located directly above the tie bar and a rubber seal profile positioned between the tie bar and the roof panels for cushioning.

21. The container of claim 20, wherein at the location of the mid span tie bar, the tie down bolt extends not only through the roof panel, but also through the tie bar.

22. The container of claim 21, wherein a bottom stiffener plate is welded to the bottom surface of the tie bar to stiffen up the tie bar where the tie bar will be engaged by the tie down bolt assembly.

23. The container of claim 18, wherein the free half of each locking bar is respectively releasably fastened to the second roof panel by a tie down bolt assembly.

24. The container of claim 23, wherein tie down bolt assembly includes a threaded tie down bolt and a threaded nut for engagement by the bolt, the bolt including a handle welded to the bolt for ease of rotation and tightening of the bolt in the nut.

25. The container of claim 24, wherein a washer is welded to the bolt to prevent the bolt from falling through the roof during bolt release from the nut.

26. The container of claim 24, wherein the threaded nut is rigidly attached to one of the roof panel and the locking bar and the tie down bolt extends through the other of the roof panel and the locking bar for engaging the nut and fastening the locking bar to the roof panel when the bolt is tightened in the nut.

27. The container of claim 26, wherein a slot profile is provided in the roof panel for accommodating the tie down bolt.

28. The container of claim 27, wherein the slot profile runs in longitudinal direction of the container for allowing some movement in the locking bar front to rear of the container.

29. The container of claim 18, wherein each locking bar is an aluminum extrusion with a generally C-shaped cross-sectional profile with hollow arms and bottom grooves incorporated into the arms of the extrusion for receiving and holding the rubber seal.

30. The container of claim 29, wherein an access opening is provided in the extrusion at the location of the tie down bolt assembly to recess the assembly into the locking bar for maximizing a volume of the container.

31. The container of claim 30, further comprising a top stiffener plate welded to the extrusion in the access opening to stiffen up the locking bar where the bar will be tightened down by the tie down bolt assembly.

32. The container of claim 31, further comprising a bottom stiffener plate welded to an underside of the roof panel to stiffen up the roof panel where the roof panel will be engaged by the tie down bolt assembly.

33. The container of claim 32, wherein both stiffener plates are provided with a slot profile for receiving the tie down bolt, in order to allow for adjustment of the bolt location during bolt installation as well as to absorb some shifting in the roof fore and aft during twisting and turning of the container.

34. The container of claim 32, wherein at least one of the stiffener plates is made of DETACLAD material, which is an explosion welded sandwich of aluminum and steel portions, in order to avoid electrolytic corrosion between the steel and aluminum portions.

35. The container of claim 34, wherein the top stiffener plate is made of the DETACLAD material and the edges of the stiffener plate are beveled to allow for welding it inside the access opening to inwardly projecting arms of the extrusion.

36. The container of claim 34, wherein the bottom stiffener plate is made of the DETACLAD material and the nut is welded to a flat steel washer which rests on top of the top stiffener plate.

* * * * *

UNITED STATES PATENT AND TRADEMARK OFFICE
CERTIFICATE OF CORRECTION

| | | |
|---|---|---|
| PATENT NO. | : 8,342,589 B2 | Page 1 of 1 |
| APPLICATION NO. | : 13/300309 | |
| DATED | : January 1, 2013 | |
| INVENTOR(S) | : Michael Kloepfer | |

It is certified that error appears in the above-identified patent and that said Letters Patent is hereby corrected as shown below:

Title Page, Item (73) Assignee, "Tital Trailers, Inc." should read --Titan Trailers, Inc.--.

Signed and Sealed this
Twelfth Day of March, 2013

Teresa Stanek Rea
*Acting Director of the United States Patent and Trademark Office*